United States Patent [19]

Scholl

[11] Patent Number: 4,499,015
[45] Date of Patent: Feb. 12, 1985

[54] CHROMIUM COMPLEX AZO DYESTUFFS AND MIXTURES OF CHROMIUM COMPLEX AZO DYESTUFFS DERIVATED FROM 1-AMINO-2-HYDROXYNAPHTALENE-4-SULPHONIC ACIDS OR AMINOPHENOLS

[75] Inventor: Walter Scholl, Cologne, Fed. Rep. of Germany

[73] Assignee: Bayer Aktiengesellschaft, Leverkusen, Fed. Rep. of Germany

[21] Appl. No.: 405,969

[22] Filed: Aug. 6, 1982

[30] Foreign Application Priority Data

Aug. 25, 1981 [DE] Fed. Rep. of Germany ....... 3133569

[51] Int. Cl.³ .................. C09B 45/16; D06P 1/10; D06P 3/04; D06P 3/14
[52] U.S. Cl. .................................... 534/697; 8/639; 8/641; 534/702; 534/722; 534/789; 534/842
[58] Field of Search ................. 260/145 B; 8/639, 641

[56] References Cited

U.S. PATENT DOCUMENTS 2,734,052  2/1956  Dittmar et al. .................. 260/146 R
2,906,746  9/1959  Brassel et al. ................... 260/145 B

FOREIGN PATENT DOCUMENTS 731495  6/1955  United Kingdom ............ 260/146 R

Primary Examiner—Floyd D. Higel
Attorney, Agent, or Firm—Sprung, Horn, Kramer & Woods

[57] ABSTRACT

Chromium complex dyestuffs of the formula

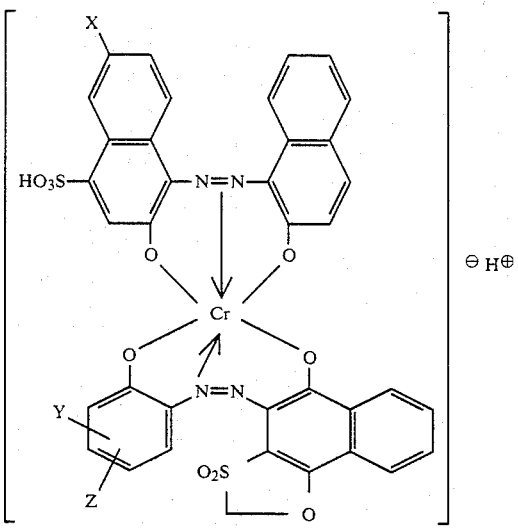

wherein
X denotes hydrogen or nitro,
Y denotes hydrogen, nitro or chlorine and
Z denotes hydrogen, nitro, chlorine, alkyl, alkoxy, alkylsulphonyl, arylsulphonyl or $SO_2NW_1W_2$ and
$W_1$ and $W_2$ denote hydrogen, aryl or alkyl, with the proviso that
Y and Z do not simultaneously represent nitro, are particularly suitable for dyeing polyamides and wool, on which they produce level dyeings having good general fastness properties.

3 Claims, No Drawings

CHROMIUM COMPLEX AZO DYESTUFFS AND MIXTURES OF CHROMIUM COMPLEX AZO DYESTUFFS DERIVATED FROM 1-AMINO-2-HYDROXYNAPHTALENE-4-SULPHONIC ACIDS OR AMINOPHENOLS

The present invention relates to 1:2 chromium complex dyestuffs which, in the form of the free acid, correspond to the formula

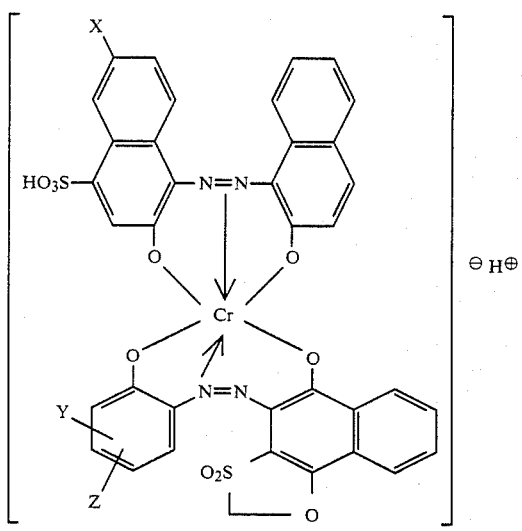

wherein

X denotes hydrogen or nitro,

Y denotes hydrogen, nitro or chlorine, and

Z denotes hydrogen, nitro, chlorine, alkyl, alkoxy, alkylsulphonyl, arylsulphonyl or $SO_2NW_1W_2$ and $W_1$ and $W_2$ denote hydrogen, aryl or alkyl, with the proviso that Y and Z do not simultaneously represent nitro.

Those alkyl and alkoxy groups mentioned in any connection are suitable which have 1–4 C atoms and which are preferably not further substituted. Methyl or ethyl and methoxy or ethoxy are particularly preferable.

Suitable aryl radicals are in particular optionally substituted phenyl radicals having substituents such as halogen, in particular Cl or Br, $NO_2$, $C_1$–$C_4$-alkoxy or $C_1$–$C_4$-alkyl.

Preferable dyestuffs are those of the formula

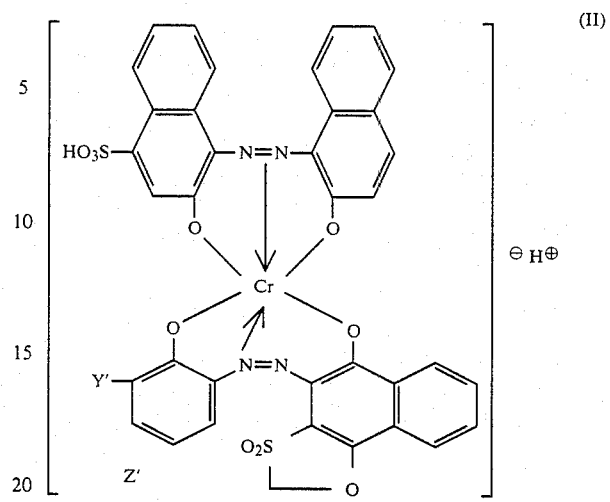

wherein

Y' denotes H, Cl or $NO_2$,

Z' denotes H, $NO_2$ or $SO_2NW'_1W'_2$ or Cl and $W'_1$ and $W'_2$ denote H or $C_1$–$C_2$-alkyl, with the proviso that Y' and Z' do not simultaneously denote $NO_2$.

The new chromium complex dyestuffs are prepared in a manner which is in itself known (compare, for example, German Auslegeschriften Nos. 2,500,550, 2,504,787 and 2,630,222), by converting one of the azo dyestuffs of the formulae

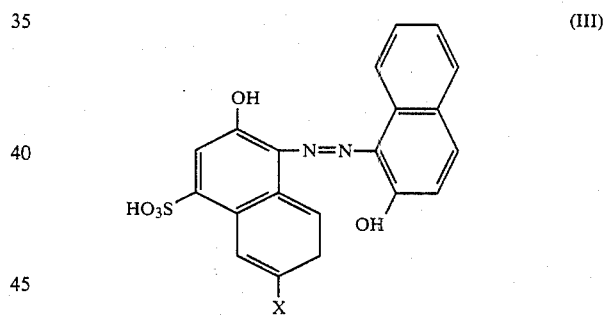

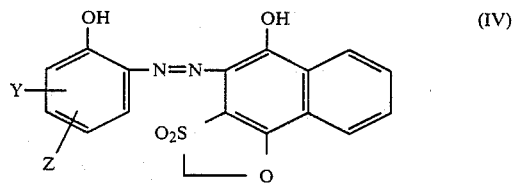

with a chromium-donating agent into the 1:1 chromium complex, which is then reacted with the non-metallised dyestuff of the formula (IV) or (III). Preferably, the 1:1 chromium complex is prepared from the dyestuff of the formula (III) and the dyestuff (IV) is added.

Monoazo dyestuffs of the formula (III) are prepared in a known manner, by coupling diazotised 1-amino-2-hydroxynaphthalene-4-sulphonic acids onto β-naphthol, and monoazo dyestuffs of the formula (IV) are obtained by coupling a diazotised aminophenol onto 4'-hydroxynaphtho-(2',1':4,5)-oxathiol-S-dioxide, which is described in, for example, German Auslegeschriften Nos. 913,177, 940,483 and 1,011,574.

Possible diazo components for dyestuffs of the formula (IV) are 4-sulphonamido-2-amino-1-hydroxybenzene, 4-methylsulphonamido-2-amino-1-hydroxybenzene, 4-dimethylsulphonamido-2-amino-1-hydroxybenzene, 4-sulphanilido-2-amino-1-hydroxybenzene, 4-ethylsulphonyl-2-amino-1-hydroxybenzene, 5-sulphonamido-2-amino-1-hydroxybenzene, 5-methylsulphonamido-2-amino-1-hydroxybenzene, 5-dimethylsulphonamido-2-amino-1-hydroxybenzene, 5-sulphonanilido-2-amino-1-hydroxybenzene, 2-amino-1-hydroxybenzene, 4- or 5-chloro-2-amino-1-hydroxybenzene, 4- or 5-nitro-2-amino-1-hydroxybenzene, 4-methyl-2-amino-1-hydroxybenzene, 4-methoxy-2-amino-1-hydroxybenzene, 4,6-dichloro-2-amino-1-hydroxybenzene, 4-chloro-5-nitro-2-amino-1-hydroxybenzene, 4-chloro-6-nitro-2-amino-1-hydroxybenzene, 6-chloro-4-nitro-2-amino-1hydroxybenzene or 6-nitro-4-methyl-2-amino-1-hydroxybenzene.

Dyestuffs of the formula (III) or (IV) are converted into the 1:1 chromium complex by methods which are customary and known in themselves (compare, for example, German Auslegeschriften Nos. 1,008,254, 1,012,007 and 1,225,318), for example by reacting the dyestuff in an acid medium with a salt of trivalent chromium, such as chromium formate, chromium sulphate or chromium fluoride, at boiling temperature or, if necessary at temperatures exceeding 100° C. Trivalent chromium can also be produced in the reaction mixture from chromium(VI) compounds by simultaneously adding a reducing agent, such as, for example, glucose. The metallisation can also be carried out in the presence of organic solvents. The reaction is then preferably carried out with water excluded as far as possible in organic solvents such as alcohols or ketones.

It is generally advantageous not to dry the starting dyestuffs required in the process according to the invention after their preparation and isolation, but to process them in the form of a moist paste.

Advantageously, the dyestuff containing sulphonyl groups is converted into the 1:1 Cr complex.

The 1:1 chromium complex of a dyestuff of the formula (III) or (IV) is advantageously reacted with a metal-free dyestuff of the formula (IV) or (III) respectively in a neutral to weakly alkaline medium at, for example, temperatures between 50° and 120° C. It is also possible to carry out the reaction in organic solvents or in an aqueous solution, in which case added solvents, such as, for example, alcohols or dimethylformamide, may be able to promote the reaction. It is generally advisable to react the chromium-containing 1:1 complex with the metal-free dyestuff in amounts which are as nearly equivalent as possible, the molar ratio between metal-free dyestuff and 1:1 complex advantageously being at least 0.85:1 and at most 1:0.85; an excess of metal-containing dyestuff has as a rule a less adverse effect than an excess of metal-free dyestuff.

Instead of using single dyestuffs of the formula (IV) or (III) it is also possible to use mixtures of corresponding azo dyestuffs.

The new mixed chromium complexes are advantageously isolated in the form of their salts, in particular alkali metal salts (for example of Na or Li) or also as ammonium salts or as salts of organic amines having a positively charged nitrogen atom, and they are suitable above all for dyeing and printing materials containing amide groups, such as silk and leather, and for synthetic polyamides and, in particular, wool. These inexpensive dyestuffs are dyed in a customary manner. The resulting dyeings are level and have good general fastness properties.

EXAMPLE 1

140 g of an aqueous dyestuff paste containing 0.1 mol of the 1:1 chromium complex of the monoazo dyestuff formed in 1-amino-2-hydroxynaphthalene-4-sulphonic acid→β-naphthol, and 225 g of an aqueous paste containing 0.055 mol of the monoazo dyestuff formed in 5-nitro-2-aminophenol→naphthhydroquinone methylene sulphone ether and 0.045 mol of the monoazo dyestuff formed in 4-chloro-2-aminophenol→"naphthhydroquinone methylene sulphone ether" are stirred into 600 ml of water, and the mixture is heated to 80°–90° C. and stirred at pH 7–8, maintained with 40% strength sodium hydroxide solution, until the conversion to the mixed chromium complex is complete. The mixture is then cooled down to 70° C., and the dyestuff is precipitated by adding sodium chloride. After filtering with suction and drying at 70° C. in vacuo, a dark powder is obtained which dyes wool and synthetic polyamide in navy shades having good fastness properties.

Further dyestuffs having similar properties are obtained analogously by reacting the 1:1 chromium complexes of the monoazo compounds indicated in column I below with the metal-free monoazo compounds listed in column II.

| I | II | Hue on wool or polyamide |
|---|---|---|
| 2 | 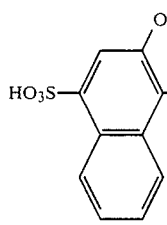 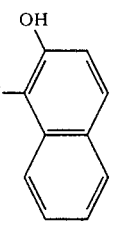 | navy |

| | | Hue on wool or polyamide |
|---|---|---|
| 3 | | " |
| 4 | | " |
| 5 | | " |
| 6 | | " |
I claim:
1. Chromium complex dyestuff of the formula
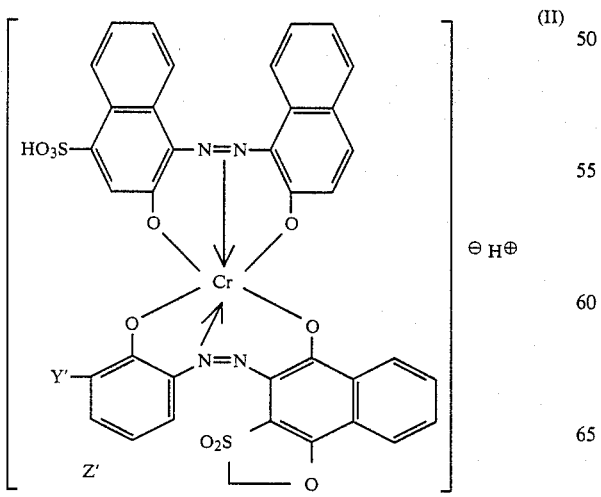
(II)
wherein
Y' denotes H, Cl or NO₂,
Z' denotes H, NO₂ or SO₂NW'₁W'₂ or Cl and
W'₁ and W'₂ denwith the proviso that
Y' and Z' do not simultaneously denote NO₂.
2. Chromium complex dyestuff of the formula

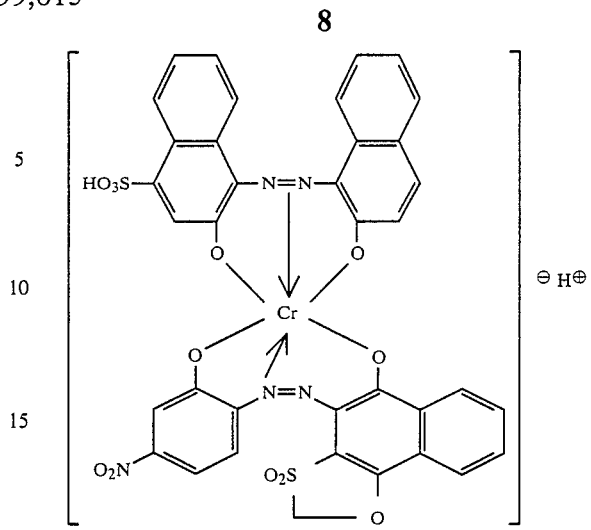
3. Mixture of mixed chromium complexes of the dyestuffs 1-amino-2-hydroxynaphthalene-4-sulphonic acid→β-naphthol+4-chloro-2-aminophenol→naphthhydroquinone methylene sulphone ether and 1-amino-2-hydroxynaphthalene-4-sulphonic acid→β-naphthol+5-nitro-2-aminophenol→naphthhydroquinone methylene sulphone ether.
* * * * *

UNITED STATES PATENT AND TRADEMARK OFFICE
CERTIFICATE OF CORRECTION

PATENT NO. : 4,499,015
DATED : February 12, 1985
INVENTOR(S) : Walter Scholl

It is certified that error appears in the above-identified patent and that said Letters Patent is hereby corrected as shown below:

| | |
|---|---|
| Col. 2, line 20 and Col. 5, line 65 | Delete bottom left of formula and substitute 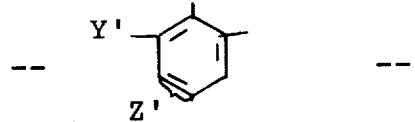 |
| Col. 2, line 46 | Insert -- or -- |
| Col. 3, line 5 | Correct spelling of "sulphonanilido" |
| Col. 3, line 17 | Insert -- - -- between "1" and "hydroxybenzene" |
| Col. 5, No. 5 under "1" | Delete bottom right of formula and substitute 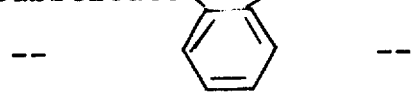 |
| Col. 6, line 66 | Delete "denwith" and insert --denote H or $C_1$-$C_2$-alkyl, with-- |

Signed and Sealed this

Eighteenth Day of June 1985

[SEAL]

Attest:

DONALD J. QUIGG

Attesting Officer     Acting Commissioner of Patents and Trademarks